United States Patent
Printz

Patent Number: 6,049,767
Date of Patent: Apr. 11, 2000

[54] METHOD FOR ESTIMATION OF FEATURE GAIN AND TRAINING STARTING POINT FOR MAXIMUM ENTROPY/MINIMUM DIVERGENCE PROBABILITY MODELS

[75] Inventor: Harry W. Printz, New York, N.Y.

[73] Assignee: International Business Machines Corporation, Armonk, N.Y.

[21] Appl. No.: 09/070,692

[22] Filed: Apr. 30, 1998

[51] Int. Cl.[7] .................................................. G10L 11/00
[52] U.S. Cl. .......................... 704/240; 704/243; 704/255
[58] Field of Search ................................... 704/240, 243, 704/255, 257

[56] References Cited

U.S. PATENT DOCUMENTS

| | | | |
|---|---|---|---|
| 5,467,425 | 11/1995 | Lau et al. | 704/243 |
| 5,640,487 | 6/1997 | Lau et al. | 704/243 |

OTHER PUBLICATIONS

A Maximum Entropy Approach to Natural Language Processing, Berger et al., Computational Linguistics, 22(1): 39–71, Mar. 1996.

Inducing Features of Random Fields, Dell Pietra et al., Technical Report CMU–CS–95–144, School of Computer Science, Carnegie Mellon University, Pittsburgh, PA, May 1995.

*Primary Examiner*—David R. Hudspeth
*Assistant Examiner*—Susan Wieland
*Attorney, Agent, or Firm*—F. Chau & Associates, LLP

[57] ABSTRACT

A method and apparatus for efficiently determining the gain of a feature function in a maximum entropy/minimum divergence probability model in a single pass through a training corpus. A method for determining the gain of a feature in such a model includes the steps of a selecting a set of evaluation points and determining the value of a function referred to as the gainsum derivative at each of the evaluation points. An approximation function which can be evaluated at substantially any point in a continuous domain is then selected based upon the discrete values of the gainsum derivative at the evaluation points. The approximation function is then employed to determine the argument value that maximizes an approximated gain function. The approximate gain value is then determined by evaluating the approximated gain function at this argument value. The apparatus of the present invention includes means for performing the steps of the disclosed method.

17 Claims, 5 Drawing Sheets

FIG. 4

| | | CORPUS | | | | | |
|---|---|---|---|---|---|---|---|
| $i$ | 0 | 1 | 2 | 3 | 4 | 5 | |
| $w^i$ | The | dog | ate | my | socks | . | |
| $h^i$ | | The | The dog | The dog ate | The dog ate my | The dog ate my socks | |
| $f_{h^i}$ | | | {socks} | {socks} | {socks} | {socks} | |

| | SYMBOLIC VALUES BY CORPUS POSITION | | | | | | SUM |
|---|---|---|---|---|---|---|---|
| $f(w^i h^i)$ | $f(w^0 h^0)$ | $f(w^1 h^1)$ | $f(w^2 h^2)$ | $f(w^3 h^3)$ | $f(w^4 h^4)$ | $f(w^5 h^5)$ | $A_f$ |
| $qh^i f$ | 0 | 0 | $q(socks|The\ dog)$ | $q(socks|dog\ ate)$ | $q(socks|ate\ my)$ | $q(socks|my\ socks)$ | |
| $\gamma_0$ | 0 | 0 | $1/(\gamma_0 + q_{h^2 f}^{-1})$ | $1/(\gamma_0 + q_{h^3 f}^{-1})$ | $1/(\gamma_0 + q_{h^4 f}^{-1})$ | $1/(\gamma_0 + q_{h^5 f}^{-1})$ | $e_0$ |
| ... | | | | | | | ... |
| $\gamma_{S-1}$ | 0 | 0 | $1/(\gamma_{S-1} + q_{h^2 f}^{-1})$ | $1/(\gamma_{S-1} + q_{h^3 f}^{-1})$ | $1/(\gamma_{S-1} + q_{h^4 f}^{-1})$ | $1/(\gamma_{S-1} + q_{h^5 f}^{-1})$ | $e_{S-1}$ |

| | NUMERIC VALUES BY CORPUS POSITION | | | | | | SUM |
|---|---|---|---|---|---|---|---|
| $f(w^i h^i)$ | 0 | 0 | 0 | 0 | 1 | 0 | 1 |
| $qh^i f$ | 0 | 0 | 8.62E-2 | 9.91E-2 | 5.61E-2 | 1.80E-1 | |
| $\gamma_0 = -1$ | 0 | 0 | 9.43E-2 | 1.10E-1 | 5.94E-2 | 2.20E-1 | 4.83E-1 |
| $\gamma_1 = 0$ | 0 | 0 | 8.62E-2 | 9.91E-2 | 5.61E-2 | 1.80E-1 | 4.21E-1 |
| $\gamma_2 = 4$ | 0 | 0 | 6.41E-2 | 7.10E-2 | 4.58E-2 | 1.05E-1 | 2.86E-1 |
| $\gamma_3 = 8$ | 0 | 0 | 5.10E-2 | 5.53E-2 | 3.87E-2 | 7.38E-2 | 2.19E-1 |

METHOD FOR ESTIMATION OF FEATURE GAIN AND TRAINING STARTING POINT FOR MAXIMUM ENTROPY/MINIMUM DIVERGENCE PROBABILITY MODELS

The U.S. Government has a paid-up license in this invention and the right in the limited circumstances to require the patent owner to license others on reasonable terms as provided for by the terms of Contract No. IRI-9314969 awarded by the National Science Foundation.

BACKGROUND OF THE INVENTION

1. Field of the Invention

The present invention relates generally to training and evaluating probability models and more particularly relates to a method and apparatus for determining the gain and training starting point of a feature function for maximum entropy/minimum divergence (MEMD) probability models, in applications such as language modeling for speech recognition systems, language translation systems, grammar checking systems and the like.

2. Description of the Related Art

In language modeling applications, probability models are used to predict the occurrence of a word based on some prior history. In the past, n-gram models have been frequently used to predict a current word based on n−1 previous words. While this model has been found to be generally useful, there are occasions when this model is unable to accurately predict the outcome based on the limited history of n−1 words. In order to improve the performance of language modeling applications, it is desirable to augment the performance of the n-gram base model during those occurrences where the n-gram model is inadequate.

One powerful technique for constructing probability models is known as maximum entropy/minimum divergence (MEMD) modeling. An MEMD model is constructed from a base model and a set of feature functions (features), whose empirical expectations, determined from a given training corpus (i.e., a large body of text for a language model), are known.

In a language modeling application, the features are generally binary functions which express a relationship between a current word being predicted and a history. The utility of the feature as a predictive element is referred to as the gain of the feature.

One way of finding potentially useful features is to inspect the training corpus and observe which words co-occur. A large corpus, consisting of tens or hundreds of millions of words, and possibly a grammatical parsing, will generally yield millions of potential features (feature candidates). In order to maximize the efficiency of an MEMD model, only those features which exhibit the highest predictive power (gain) should be used in constructing the model. Therefore, the fundamental task with MEMD modeling is to evaluate the gain of the candidate features, rank them according to their utility, and retain those features that exhibit the highest gain values.

Currently, several methods for determining the gain of a feature in an MEMD model have been suggested. For example, in the article entitled *"Inducing Features of Random Fields"* by Della Pietra et al., Technical Report CMU-CS 95-144, School of Computer Science, Carnegie Melon University, May 1995, a closed form analytic expression for the gain of a feature is derived. The derived expression applies to the gain of a feature for a single joint probability model, p(w h), which is constructed from a single joint prior, q(w h). However this process is not applicable to systems having many conditional models, p (w|h), where each model is individually normalized. This is the case in language models, and many other applications of MEMD models.

Another method used in the prior art for determining the gain of a feature is referred to as the Newton-Raphson method, which generally uses an iterative process to calculate the gain of the feature. In general, the Newton-Raphson method requires several passes through the corpus, where the first and second derivative of a gain function are calculated to determine the argument value where the first derivative of the gain equation is equal to zero (maximum gain). The gain of the feature is then determined from that argument value. However, in order to reach convergence, several passes through the corpus are required for this process. Because a useful corpus in a language modeling application is on the order of tens of millions of words, multiple passes through the corpus generally require a prohibitive amount of computer processing time.

As an alternative, the Newton-Raphson can theoretically be applied in a single pass through the corpus. To do this, the value of the conditional expectation of the base probability model, $q_{hf}$, needs to be solved for each position in the corpus where $q_{hf}>0$. Each solution is then stored for subsequent use. However, such an operation requires vast amounts of computer storage capacity. For practical language modeling applications, the required storage capacity is on the order of hundreds of gigabytes, an amount not generally available in a typical computer system.

Accordingly, there is a need in the art for a method of determining the gain of a feature in a probability model in only a single pass through the corpus which only requires a modest dedication of memory and computer processing time.

SUMMARY OF THE INVENTION

A method for determining the gain of a feature in an MEMD model includes the steps of selecting a set of evaluation points and determining the value of a function referred to as the gainsum derivative of the feature function at each of the evaluation points. An approximation function which can be evaluated at substantially any point in a continuous domain is then selected based upon the discrete values of the gainsum derivative at the evaluation points. The approximation function is then employed to determine the argument value that maximizes an approximated gain function of the feature (argmax). The approximate gain value is then determined by evaluating the approximated gain function at the argmax point.

In accordance with a further method of the present invention, the approximation function is selected based upon a curve fit to the discrete points of the gainsum derivative. A preferred curve fit is a least squares fit which is established by determining the coefficients of a polynomial reciprocal expression.

In accordance with a preferred method of the present invention, the value of the gain is determined by integrating the approximation function over a range from 0 to the argmax point. The integration is performed numerically, without requiring an additional pass through the corpus.

In accordance with one form of the present invention, a system for evaluating the gain of a feature in a MEMD language model includes a computer processor, a data file storing a language vocabulary, a data file storing a training corpus, a data file storing a plurality of selected sample points, and a data file storing at least one feature for evaluation. The computer processor operates under the control of a computer program for determining an argument value (argmax) that maximizes a gain value of each feature in the feature data file. The computer processor then evaluates the gain value of each feature at the corresponding argmax value.

These and other features, objects and advantages of the present invention will become apparent from the following detailed description of illustrative embodiments thereof, which is to be read in connection with the accompanying drawings.

BRIEF DESCRIPTION OF THE DRAWINGS

The invention will be described in detail in the following description of preferred embodiments with reference to the following figures wherein:

FIG. 4 is a table depicting the accumulation of required numerical values for the determination of the argmax point and gain of one feature for a language modeling example.

DETAILED DESCRIPTION OF PREFERRED EMBODIMENTS

Figure 1:
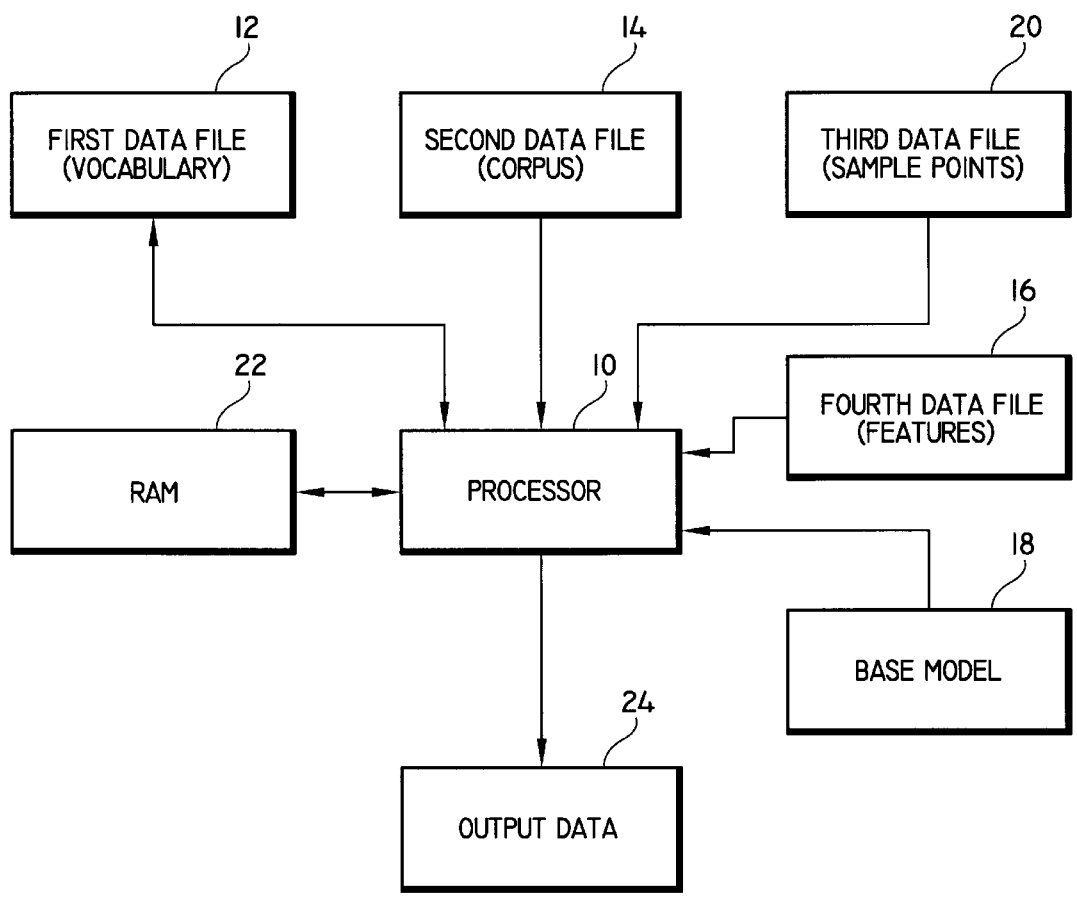
FIG. 1 is a block diagram of a computer-based language modeling system formed in accordance with the present invention.

The present invention relates to the determination of a gain value for a feature of a language model. Language models are formed using a probability model which is trained using a fixed corpus (generally tens or hundreds of millions of words, formatted as sentences) and a vocabulary (tens of thousands of words). The corpus places the words of the vocabulary in context for training. Based on the corpus, a large number of candidate feature functions are derived in a manner known in the art of language modeling, such as by determining which words are likely to occur in proximity to one another. A large corpus, consisting of millions of words, and possibly a grammatical parsing, will generally yield millions of potential features. In order to maximize the efficiency of an MEMD probability model, only those features which exhibit the highest predictive power (gain) should be incorporated into the model. The present invention provides an efficient method for evaluating the gain of a feature for subsequent ranking according to descending utility.

The gain function for a feature is defined by the equation:

$$G(\alpha) = \frac{1}{N} \log \frac{P_\alpha(C)}{P(C)} \tag{1}$$

where $P_\alpha(C)$ is the probability of the corpus resulting from an exponential model containing that feature only, $P(C)$ is the probability of the corpus resulting from a selected base model (typically an n-gram model) and N is the number of words which make up the corpus.

The probability resulting from the corpus, $P(C)$, can be expressed as:

$$P(C) = \prod_{wh} q(w|h)^{\tilde{c}(w\ h)} \tag{2}$$

Where $q(w|h)$ is the selected base model and $\tilde{c}(w\ h)$ is the number of times the word, history pair (w,h) appears in the corpus. Note that $P(C)$ is not dependent on the value of $\alpha$.

Equation (1) illustrates that the gain function, $G(\alpha)$, is a figure of merit which represents the degree of improvement achieved by the exponential model as compared to the base model for any given value of $\alpha$. The objective in MEMD modeling is to determine that value of the argument $\alpha$ that maximizes the value of equation $G(\alpha)$. This argument value, argmax $\alpha P_\alpha(C)$, is denoted as $\alpha^*$. Once $\alpha^*$ is determined, the value of the gain of the given feature is found by evaluating the gain function at this point. This can be expressed as:

$$G(\alpha^*) = \frac{1}{N} \log \frac{P_\alpha * (C)}{P(C)} \tag{3}$$

$P_\alpha*(C)$ is a value determined by evaluating the probability function, $P_\alpha(C)$, at the point $\alpha^*$. For a given value of $\alpha$, the probability $P_\alpha(C)$ is defined by the equation:

$$P_\alpha(C) = \prod_{wh} p_\alpha(w|h)^{\tilde{c}(w\ h)} \tag{4}$$

where $\tilde{c}(w\ h)$ is the number of times the word, history pair (w, h) appears in the corpus and $p_\alpha(w|h)$ is a conditional exponential model derived from the base function and the feature, which is expressed as:

$$p_\alpha(w|h) = \frac{q(w|h)e^{\alpha f(w\ h)}}{Z(\alpha\ h)} \tag{5}$$

where $Z(\alpha h)$ is a normalizing function, defined by the equation:

$$Z(\alpha\ h) = \sum_w q(w|h)\ e^{\alpha f(w\ h)} \tag{6}$$

The present invention evaluates a gainsum derivative function (equation 18) at a number of selected points to establish a gainsum derivative vector. From the gainsum derivative vector, an approximation function is selected which can be evaluated at any point in a continuous domain. From the approximation function, the argument $\alpha^*$ is determined.

FIG. 1 is a block diagram illustrating a computer-based system suitable for operating in accordance with a method of the present invention. In FIG. 1, a processor 10 is interfaced to readable electronic storage wherein data files including a vocabulary (V) 12, a corpus (C) 14, a set having at least one feature ({f (w h)}) 16, a base model (q(w|h)) 18 and a set of selected points (Γ) 20 are provided in electronically accessible format. These files are conventionally maintained in storage media such as magnetic storage, optical storage (CD-ROM), or solid state memory (ROM). The system of FIG. 1 further includes a read/write memory (RAM) 22 for temporary storage and retrieval operations. The system also includes at least one read/write storage unit 24 for storing output data from the processor 10. The computer-based system of FIG. 1 operates in accordance with the present invention to efficiently calculate the argmax value of a feature's gain function, and determine the gain of the feature by evaluating the gain function at the argmax point.

Figure 2:
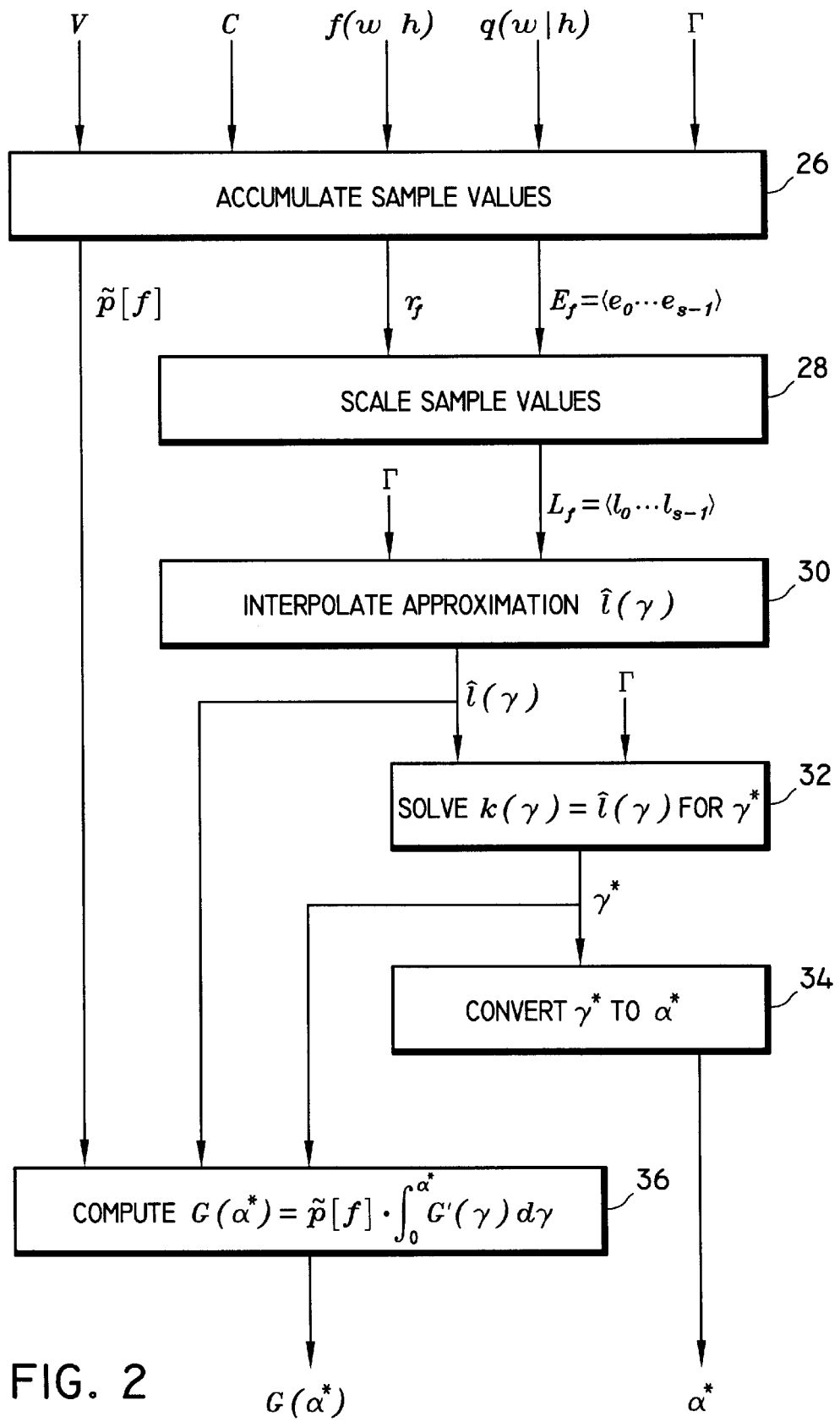
FIG. 2 is a block/flow diagram of a system and method formed and operating in accordance with the present invention.
Figure 3:
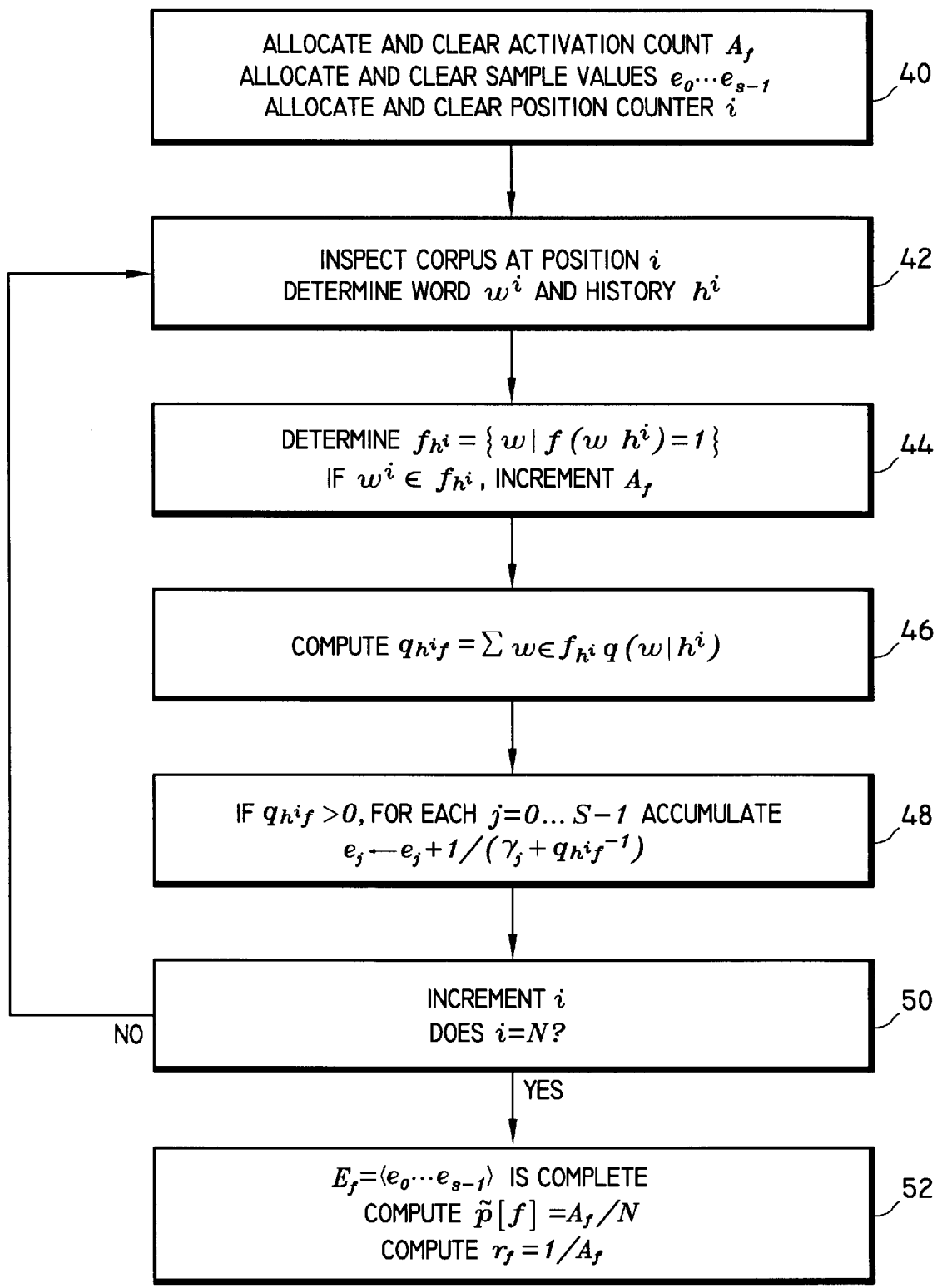
FIG. 3 is a flow chart further illustrating a method in accordance with the present invention.

A method of practicing the present invention is illustrated in FIGS. 2 and 3. Initially, the processor 10 performs an accumulation process for a given feature (step 26), which is further illustrated in FIG. 3. The accumulation process begins with an initialization step (step 40) in which a corpus position counter (i) is initialized, a memory block is allocated and cleared for storing sample values ($e_j$) and an activation counter ($A_f$) is allocated and cleared. The corpus position counter, i, denotes the current word position in the corpus. The activation counter ($A_f$) denotes the number of times the feature under evaluation has been active (i.e., the feature returns a value of 1). The values of $e_j$ represent a summation at each of the selected sample points ($\Gamma$) taken when the feature is found to be active or potentially active. A feature is said to be potentially active at a given position i in the corpus when for the history ($h^i$) there exists some word, w, such that $f(w\ h^i)=1$.

The points in the $\Gamma$ data file 20 are intuitively selected based on previous experience with features applied to a given corpus. The values are selected across a range in which the maximizing value of the gain argument ($\alpha^*$) is expected to reside. In addition, the number of points selected is a design tradeoff between accuracy and processing time. For a small test corpus of 25103 words composed of articles from the Wall Street Journal, a suitable set of points for $\Gamma$ included four (4) points spaced over the range of $-1$ to 8. For larger corpora, six (6) points have been found to provide good results.

Once initialization is complete, the method advances to step 42 where the corpus is inspected at the position indicated by the corpus position counter (i) to determine the current word ($w^i$) and the history ($h^i$). At every position in the corpus, the feature function is evaluated to determine whether the feature is active (step 44). If the feature is active, the activation counter ($A_f$) is incremented (step 44). At each position within the corpus where the feature is active or potentially active, the value of the conditional expectation at that position, $q_{h^i f}$, is calculated (step 46) where:

$$q_{hf} = \sum_{w \in f_h} q(w|h) \qquad (7)$$

$f_h$ being the set of all w's such that $f(w\ h)=1$. If at position i in the corpus, $q_{h^i f} > 0$, then each of the sample points in the $\Gamma$ data file 20 (i.e., $\gamma_j$, where $j = 0 \ldots S-1$, and where S is the number of points in the vector $\Gamma$) are applied to an accumulation equation which provides values for the accumulated sample points $e_j$, according to the expression:

$$e_j \leftarrow e_j + \frac{1}{\gamma_j + (q_{h^i f})^{-1}} \qquad (8)$$

Equation 8 states that the current value of $e_j$ is equal to the last value of $e_j$ plus the reciprocal of the sum of the values of the sample value of vector $\Gamma$ plus the reciprocal of $q_{h^i f}$ evaluated at the current corpus position (i). The result is a vector, denoted $E_f = (e_0 \ldots e_{s-1})$, which represents the accumulated sample points summed over each position in the corpus where the feature is active or potentially active. The vector $E_f$ is referred to as the unscaled derivative sample vector.

After the samples have been accumulated, the corpus position counter is incremented and tested to determine whether the entire corpus has been evaluated (step 50). So long as the position counter has a value less than the number of elements in the corpus (i<N), the method will repeat steps 42 through 50. When the entire corpus has been evaluated (i=N), the accumulated sample vector $E_f$ is complete. At this point, the empirical expectation of the feature is calculated by dividing the value of the activation counter by the number of elements in the corpus (step 52). This can be expressed as:

$$\tilde{p}[f] = \frac{A_f}{N} \qquad (9)$$

For mathematical convenience, the reciprocal of the activation counter is also calculated at step 52. This variable is denoted as $r_f$.

In order to appreciate the significance of the variables $\tilde{p}[f]$, $r_f$ and $e_j$, the following derivation is provided. For a binary feature function, the gain function of the feature can be expressed as:

$$G(\gamma) = \tilde{p}[f]\left(\log(\gamma + 1) - r_f \sum_{h \in C} \log(\gamma q_{hf} + 1)\right) \qquad (10)$$

where $$\gamma = e^\alpha - 1 \qquad (11)$$

$$q_{hf} = \sum_{w \in f_h} q(w|h) \qquad (12)$$

The term in parenthesis in equation 10 can be rewritten as a new function, $m(\gamma)$, defined as $$m(\gamma) = \log(\gamma + 1) - r_f \sum_{h \in C} \log(\gamma q_{hf} + 1) \qquad (13)$$

Because the term $\tilde{p}[f]$ is constant with respect to $\gamma$, the argument that provides the maximum value for $m(\gamma)$ also provides the maximum value for the gain function $G(\gamma)$. In order to determine the value of this argument, the derivative of $m(\gamma)$ is taken and set equal to zero, yielding:

$$m'(\gamma) = \frac{1}{\gamma + 1} - r_f \sum_{h \in C} \frac{q_{hf}}{\gamma q_{hf} + 1} = 0. \qquad (14)$$

which can be rewritten as:

$$m'(\gamma) = k(\gamma) - l(\gamma) = 0 \qquad (15)$$

where $$l(\gamma) = r_f \sum_{h \in C} \frac{q_{hf}}{\gamma q_{hf} + 1} \qquad (16)$$

$$k(\gamma) = \frac{1}{\gamma + 1} \qquad (17)$$

The maximum value of $m(\gamma)$ is then attained at the point $\gamma^*$, where $k(\gamma^*) = l(\gamma^*)$.

The terms that contribute to $l(\gamma)$ are nonzero only when $q_{hf} \neq 0$. Therefore, $l(\gamma)$ can be expressed as:

$$l(\gamma) = r_f \sum_{h \in C}^{\wedge} \frac{1}{\gamma + q_{hf}^{-1}} \quad (18)$$

where ∧ indicates that the sum is restricted to those positions where $q_{hf}>0$. This expression is referred to as the gainsum derivative.

Calculating the gainsum derivative over a continuous domain is prohibitive. Therefore, the present invention evaluates the exact value of the gainsum derivative only at selected points in the desired domain and then produces an approximation function to provide an expression which can be easily evaluated at any point in the domain. The values in the vector $E_f$ which are accumulated in steps 42 through 50 (FIG. 3) represent the summation operation required to calculate the gainsum derivative at the selected points. The value of the gainsum derivitive at the selected points, is expressed by the equation:

$$l_j = r_f e_j \quad (19)$$

Therefore, once the activation count, $A_f$, and $e_j$ are known, the values of $l_j$ can be easily calculated.

Returning to FIG. 2, once step 52 is complete, the method continues by performing a scaling operation in step 28. Receiving $r_f$ and $E_f$ as inputs, the processor 10 (FIG. 1) multiplies each point ($e_j$) in the vector $E_f$ by $r_f$ to arrive at a new vector $L_f$, which is denoted as the gainsum derivative vector. In effect, the value of the unscaled derivative vector is adjusted by the number of activations of the feature throughout the corpus.

In order to derive a closed form expression of the gainsum derivative, the discrete points in the gainsum derivative vector are used to select an approximation function for the gainsum derivative which can be easily evaluated at any point in a continuous domain (step 30). The selection of the approximation function is performed by fitting a curve to the points in the vector $L_f$. While many conventional curve fitting methods can be applied to the method of the present invention, such as cubic splines and various forms of least squares fit, a least squares fit based on polynomial reciprocals is preferred. In this process, the approximation function is expressed as:

$$\hat{l}(\gamma) = \frac{1}{c(\gamma)} = \frac{1}{c_o + c_1\gamma + c_2\gamma^2 \ldots + c_n\gamma^n} \quad (20)$$

where the value of the coefficients ($c_0, \ldots c_n$) are obtained by performing a least squares fit of the polynomial $c_0\gamma+c_1\gamma+\ldots+c_n\gamma^n$, to the points ($\gamma_j, l_j^{-1}$).

After $\hat{l}(\gamma)$ is determined, the method then proceeds to solve the equation $k(\gamma)-\hat{l}(\gamma)=0$ to arrive at the value of $\gamma^*$ (step 32). After $\gamma^*$ is known, the desired argument, $\alpha^*$, is determined in step 34 by the relation:

$$\alpha^* = \log(\gamma^* + 1) \quad (21)$$

Finally, the approximate value of the gain is calculated by determining an approximation to the value of $m(\gamma^*)$ and multiplying this value by the expectation of the feature (from step 34). To determine an approximation to $m(\gamma^*)$, the estimated derivative $m'(\gamma)$ is numerically integrated over the interval from 0 to $\gamma^*$. This can be expressed:

$$\hat{m}(\gamma^*) = \log(\gamma^* + 1) - \int_0^{\gamma^*} \hat{l}(\gamma) d\gamma. \quad (22)$$

The gain is then determined by an approximated gain function, $$\hat{G}(\alpha^*) = \tilde{p}[f] * \hat{m}(\gamma^*),$$

which is solved in step 36. This equation provides a result in units of nats. To convert this result to bits, the result is then multiplied by $\log_2 e$, where e is Euler's constant, the base of natural logarithms.

It will be appreciated that the method described provides the gain of an individual feature in a language model. In actual applications, this method is applied, preferably in parallel, to each of many candidate features to calculate their respective gain values. From the calculated gain values, the features are then ranked according to their utility. Those features exhibiting a gain value below some predetermined threshold value are simply discarded.

The present invention will now be demonstrated by an example. The exemplary feature we will analyze, written $f_{dog, socks}$, is defined as follows:

$$f_{dog,socks(w h)} = \begin{cases} 1 & \text{if } w = socks \text{ and } dog \text{ appears in } h \\ 0 & \text{otherwise} \end{cases}$$

This function is commonly known as a trigger feature, for the trigger pair (dog, socks). Note that it is binary-valued, and that for any h, the set $f_h = \{w|f(w\ h)=1\}$ is either {socks} or empty.

In this example, the corpus C consists of one single sentence:

The$_0$ dog$_1$ate$_2$my$_3$socks$_4$ .$_5$

This corpus comprises 6 positions, so N=6. The positions are numbered starting with 0, as indicated by the subscripts displayed above. The vocabulary V contains 56703 words. The selected base model q(w|h) is a linearly interpolated trigram model, computed on a (different) corpus of 44,761,334 words.

Figure 4A:
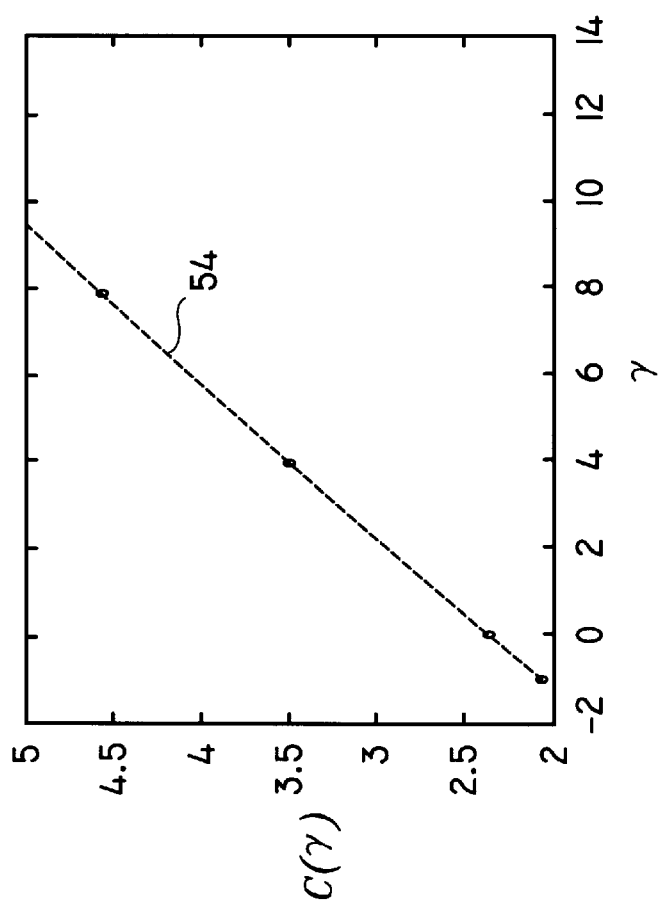
FIGS. 4A and 4B are graphs depicting the determination of the argmax point and gain of one feature for a language modeling example.
Figure 4B:
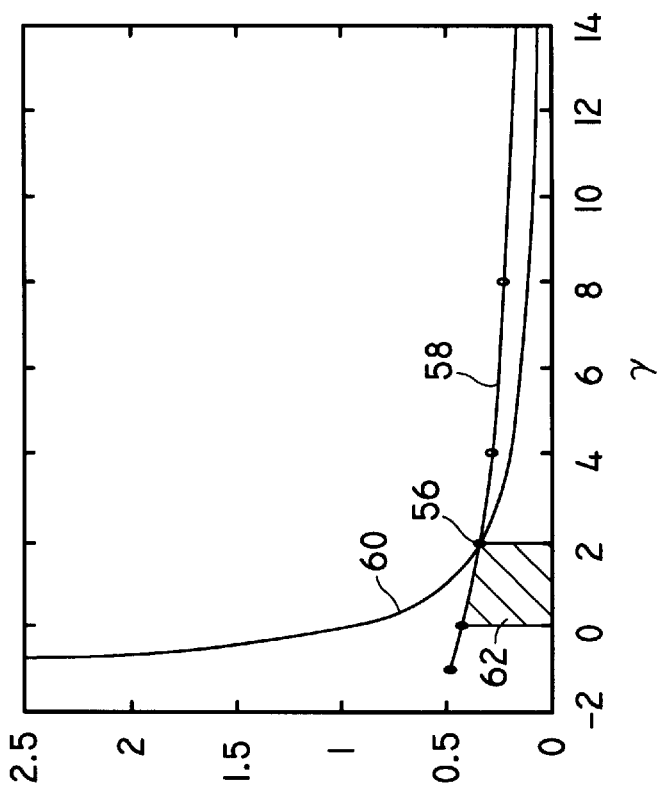

The table illustrated in FIG. 4 and the graphs in FIGS. 4A and 4B illustrate the computation of the gain of the feature $f_{dog, socks}$. Referring to FIG. 4, the table is divided into three stanzas. The top stanza, which bears the legend "Corpus", shows how the corpus position i, and the associated values $w^i$ and $h^i$, are defined. Note that $h^i$ consists of all words up to but not including $w^i$. In this example, the corpus has not been parsed, so each $h^i$ consists of only words. However, it would not be unusual for $h^i$ to incorporate the parse of the complete sentence that encompasses position i, or even some information computed from an audio recording of a speaker reading the corpus aloud.

The middle stanza, "Symbolic Values by Corpus Position," illustrates the quantities of interest at each position, given by their symbolic definitions. Note that the top row, which corresponds to the quantity $f(w^i h^i)$ has an entry $A_f$ in the last column. This reflects the definition $$A_f = \sum_i f(w^i h^i)$$

which can be determined by summing the entries in its row.

The second row shows the base model probabilities that must be computed. Note that since q is a trigram model, the value of each $q(w^i|h^i)$ depends only upon $w^i$ and the two most recent words of $h^i$.

The bottom rows of this stanza are unlike the others. In the $\gamma_0$ row, for instance, we are computing not the value of $\gamma_0$, but rather the value of the summand $1/(\gamma+q_{h^i f}^{-1})$ evaluated at $\gamma=\gamma_0$. Note that each of these rows also has an entry in the "Sum" column. This reflects the family of definitions $$e_j = \sum_{i \in C} 1/(\gamma_j + q_{h^i f}^{-1})$$

for $j=0 \ldots S-1$. As above, each of these quantities can be computed by summing over their respective rows.

Finally, the third stanza, "Numeric Values by Corpus Position," displays the numeric value of each of the quantities given symbolically in the preceding stanza. We chose $S=4$, with $\gamma_0=-1$, $\gamma_1=0$, $\gamma_2=4$ and $\gamma_3=8$. The entries in FIG. 4 for $q_{h^i f}$ have been scaled from their true values by a factor of $10^5$ in order to make the graphs of FIGS. 4A and 4B more illustrative.

The computation of $E_f=(e_0 e_1 e_2 e_3)$ is now complete. Since $A_f=1$ and $L_f=r_f \cdot E_f=(1/A_f) \cdot E_f$, we have: $L_f=E_f=(0.483\ 0.421\ 0.286\ 0.219)$. Using the polynomial reciprocal method, the data points that $c(\gamma)$ is fit to are:

$$\{ \langle \gamma_0, l_0^{-1} \rangle\ \langle \gamma_1, l_1^{-1} \rangle\ \langle \gamma_2, l_2^{-1} \rangle\ \langle \gamma_3, l_3^{-1} \rangle \} =$$
$$\{ \langle -1, 2.069 \rangle\ \langle 0, 2.373 \rangle\ \langle 4, 3.502 \rangle\ \langle 8, 4.571 \rangle \}$$

Applying a least-squares fit to this data with a degree-3 polynomial yields:

$$c(\gamma)=2.37304+0.298458\gamma-0.00511735\gamma^2+0.000268482\gamma^3$$

The data points and the graph of $c(\gamma)$ 54, appear in the graph of FIG. 4A. Recalling that $\hat{l}(\gamma)=1/c(\gamma)$, and transforming the canonical equation $\hat{l}(\gamma)=k(\gamma)$, to the form $c(\gamma)-(1+\gamma)=0$, finally yields:

$$1.37304-0.701542\gamma-0.00511735\gamma^2+0.000268482\gamma^3=0.$$

Solving this last equation by bisection in the interval (0,4), we obtain $\gamma^* =1.93$, which is illustrated in FIG. 4B as the abscissa value at the intersection 56 of the curves representing $\hat{l}(\gamma)$ 58 and $k(\gamma)$ 60. The value of $\gamma^*$ is then converted into $\alpha^*$ by the relationship, $\alpha^*=\log(\gamma^*+1)=1.076$. From this value, the gain is then calculated through integration:

$$G(\alpha^*) = \tilde{p}[f]\left(\log(\gamma^* + 1) - \int_0^{\gamma^*} \hat{l}(\gamma) d(\gamma)\right)$$
$$= 1/6(1.076 - .731) = 0.0576 \text{ nats}$$

$$G(\alpha^*)=(\log_2 e) \cdot 0.0576=0.0975 \text{ bits}.$$

The integral $$\int_0^{\gamma^*} \hat{l}(\gamma) d(\gamma)$$

is illustrated by the hatched region 62 in FIG. 4B. Significantly, the use of numerical integration allows the gain to be calculated without another pass through the corpus.

While the present invention has been described to this point in the context of binary valued feature functions, the principles of the present invention apply to general features as well. The gain function and first derivative of the gain function for a general feature can be expressed as:

$$G(\beta) = \tilde{p}[f]\left(\log \beta - r_f \sum_{h \in C} \log Z(\beta\ h)\right) \tag{23}$$

$$G'(\beta) = \tilde{p}[f]\left(\frac{1}{\beta} - r_f \sum_{h \in C} \frac{1}{Z(\beta\ h)} \frac{\partial}{\partial \beta} Z(\beta\ h)\right) \tag{24}$$

where $\beta=e^\alpha$ and where $$Z(\beta\ h) = \sum_{w \in V} q(w|h)\beta^{f(w\ h)}.$$

As before, the method of the present invention requires the sampling and approximation of the summation term of $G'(\beta)$, as follows:

$$n(\beta) = r_f \sum_{h \in C} \frac{1}{Z(\beta\ h)} \frac{\partial}{\partial \beta} Z(\beta\ h) \tag{25}$$

In the case where the feature f takes values in the non-negative integers, $Z(\beta h)$ is a polynomial expressed as: $Z(\beta h)=q_{0h}+q_{1h}\beta \ldots q_{Fh}\beta^F$, where F is the maximal value attained by f on the corpus, and each $q_{sh}$ is defined by:

$$q_{sh} = \sum_{w \in V_{sh}} q(w|h) \text{ where } V_{sh} = \{w \in V | f(w\ h) = s\} \tag{26}$$

Writing $q_h(\beta)$ for the above polynomial, $n(\beta)$ is expressed as the sum of functions:

$$n(\beta) = r_f \sum_{h \in C} \frac{q'_h(\beta)}{q_h(\beta)} \tag{27}$$

From these equations, the method is analogous to that previously described in detail for the binary valued features. Namely, the expression for $n(\beta)$ is evaluated at a set of preselected points, $B=\{\beta_0 \ldots \beta_{S-1}\}$; the value of the fraction $q'_h(\beta)/q_h(\beta)$ at each sample point is summed over the training corpus; the function $n(\beta)$ is approximated by a substantially continuous function $\hat{n}(\beta)$; and the canonical equation $1/\beta=n(\beta)$ is solved for the argmax point, $\beta^*$. The gain is then calculated by evaluating the equation:

$$G(\beta^*) = \tilde{p}[f]\left(\log \beta^* - \int_1^{\beta^*} \hat{n}(x) dx\right) \tag{28}$$

It will be appreciated that this process is not limited to f in the range of positive integers. All that is required is to compute a set of sample values $n(\beta_0) \ldots n(\beta_{S-1})$ and then use these values to develop an approximation function that is both accurate and easy to integrate numerically.

In an alternate method of the present invention, a Taylor series is employed to estimate the value of the gainsum derivative. In this approach, each summand $1/(\gamma+q_{hf}^{-1})$ of the gainsum derivative, is expanded by a Taylor series as illustrated below in equation (29)

$$\frac{1}{\gamma + q_{hf}^{-1}} = q_{hf} - q_{hf}^2 \gamma + q_{hf}^3 \gamma^2 - q_{hf}^4 \gamma^3 + \ldots \qquad (29)$$

and then the coefficients of like powers of γ are summed. If like powers of $\gamma$ in these series are summed over h and the result is scaled by $r_f$, we obtain $$l(\gamma) = r_f \sum_{h \in C} \frac{1}{\gamma + q_{hf}^{-1}} = r_f(q_0 - q_1\gamma + q_2\gamma^2 - q_3\gamma^3 + \ldots) \qquad (30)$$

where $$q_j = \sum_{h \in C} q_{hf}^{j+1} \qquad (31)$$

By truncating the parenthesized series of equation (30) to some finite degree, which is selected empirically based on experience with features on a given corpus, we obtain an approximation function for $l(\gamma)$ and we can proceed as before.

A problem with this approach is that each series has a limited radius of convergence defined by the equation:

$$R_f = \min_{h \in C} \frac{1}{q_{hf}} \qquad (32)$$

Therefore, if $q_{hf}$ attains a value close to 1 even once on the corpus, the approximation function $\hat{l}(\gamma)$ may be of little value.

To avoid this condition, two approaches are presented. The first is to expand each function $1/(\gamma + q_{hf}^{-1})$ not about $\gamma=0$, but about some constant $\gamma_c \gg 1$. That is, we fix $\gamma_c$ and approximate the function $$l_c(\gamma) = r_f \sum_{h \in C} \frac{1}{\gamma + \gamma_c + q_{hf}^{-1}} \qquad (33)$$

by a truncated Taylor series. Since $l(\gamma) = l_c(\gamma - \gamma_c)$, we then approximate $l(\gamma)$ by $\hat{l}_c(\gamma - \gamma_c)$. This is helpful because the series of equation (30) is valid only in the smallest of the intervals $(-q_{hf}^{-1}, q_{hf}^{-1})$, whereas equation (33), via the relation between 1 and $l_c$ gives valid results for $l(\gamma)$ in the smallest of the intervals $(-q_{hf}^{-1}, 2\gamma_{c+qhf}^{-1})$.

The second possibility is not to approximate $l(\gamma)$ at all, but rather its reciprocal, $$r(\gamma) = \frac{1}{l(\gamma)}. \qquad (34)$$

Note that the derivatives of $r(\gamma)$ are related to those of $l(\gamma)$ in a straightforward way, specifically by the relations:

$$r'(\gamma) = -\frac{l'(\gamma)}{l(\gamma)^2} \quad r''(\gamma) = \frac{2l'(\gamma)^2}{l(\gamma)^3} - \frac{l''(\gamma)}{l(\gamma)^2} \qquad (35)$$

and so on by repeated differentiation. These expressions are simple rational combinations of $l(\gamma)$, $l'(\gamma)$ and $l''(\gamma)$ and higher order derivatives. Thus it is these derivatives of $l(\gamma)$, evaluated at $\gamma=0$, that are required. These are readily computed, since direct differentiation of the equation for $l(\gamma)$ yields:

$$l^{(i)}(0) = r_f(-1)^i(i!) \sum_{h \in C} q_{hf}^{i+1} \qquad (36)$$

where $l^{(i)}$ represents the ith derivative of $l(\gamma)$. Thus for this approach, the underlying computation amounts to computing the powers $q_{hf}$, $q^2_{hf}$, $q^3_{hf}$ ... up to some fixed degree at each position of the corpus and then summing the terms with like powers. The necessary sign changes, multiplications by $r_f$ and i! and the combination of the $l^{(i)}(0)$ to obtain $r(0)$, $r'(0)$, and so on, can all be performed after the accumulation over the corpus is complete. Once we have the $r^{(i)}(0)$ to some fixed order, we can use a truncated power series to approximate $r(\gamma)$, and then solve the canonical equation:

$$\frac{1}{\gamma+1} - \frac{1}{\hat{r}(\gamma)} = 0 \qquad (37)$$

for $\gamma^*$.

In yet another alternate embodiment the present invention, the value of the gain of a feature is estimated by sampling and approximating the gain function directly rather than its derivative. Starting from the generalized gain function, we can define a new function:

$$s(\beta) = r_f \sum_{h \in C} \log Z(\beta h) \qquad (38)$$

where $\beta = e^\alpha$. This function is then sampled at selected points $B = \{\beta_0 \ldots \beta_{S-1}\}$ and an easily-differentiable approximant $\hat{s}(\beta)$ is computed in a similar manner to that previously discussed. The gain function is then differentiated explicitly and set equal to 0, resulting in the canonical equation:

$$\frac{1}{\beta} - \hat{s}'(\beta) = 0 \qquad (39)$$

for the maximizing argument value $\beta^*$. Finally, we directly compute an approximation to the gain as:

$$G(\beta^*) \approx \tilde{p}[f](\log \beta^* - \hat{s}(\beta^*)) \qquad (40)$$

Note that in this alternate embodiment, no numerical integration is required.

In addition to providing the argument value for the gain, the argmax point has also been found to provide an excellent starting point for training an MEMD probability model.

The present invention provides an efficient method for calculating the gain of a feature for an MEMD probability language model. The method is performed in a manner that is efficient in both the use of memory and processing resources. The present invention has been found to operate more than four times faster than the Newton-Raphson method while achieving an error rate less than 1%. In addition, the memory required to practice the present invention has also been found to be reasonable. For a set of |F| candidate features, The memory required for the present invention can be expressed as:

$$M(|F|, S) = B + R \cdot |F| + X|F| \cdot S \qquad (41)$$

where B is a base memory allocation to hold the vocabulary and other fixed objects, R is the memory needed to represent a feature, X is the size of each element of the vector $E_f$ and S is the number of points in the vector $E_f$. For example, in a simple test case operating on 1000 Wall Street Journal sentences (25103) words with 100,000 link features, a memory allocation of 18 MB was adequate.

Having described preferred embodiments of the present invention, it is noted that modifications and variations can be made by persons skilled in the art in light of the above teachings. It is therefore to be understood that changes may be made in the particular embodiments of the invention disclosed which are within the scope and spirit of the invention as outlined by the appended claims.

What is claimed is:

1. A program storage device readable by a machine, tangibly embodying a program of instructions executable by the machine to perform method steps for determining a gain value of a feature in an MEMD (maximum entropy/minimum divergence) probability model, the method comprising the steps of:

receiving as input, a corpus comprising a plurality of words, a list of features representing one of grammatical and semantic relationships among words, and a set of evaluation points;

for each feature;
    determining a value of a gainsum derivative function at each of said evaluation points, resulting in a gainsum derivative vector;
    selecting a continuous approximation function based upon said gainsum derivative vector;
    determining the argument value that maximizes the value of an approximated gain function from said approximation function; and
    determining the approximate gain value by evaluating the approximated gain function at said argument value; and
    outputting for use in constructing an MEMD model one of (1) the features and corresponding argument values, for those features having an approximate gain value that exceeds a predetermined threshold value and (2) all the features and corresponding approximate gain values and argument values.

2. The program storage device of claim 1, wherein the instructions for performing the step of determining a value of a gainsum derivative function comprise instructions for performing the steps of:

a) inspecting said corpus at a first position;
   b) determining if the feature is at least one of active and potentially active at said corpus position;
   c) calculating a conditional expectation of the base model when the feature is at least one of active and potentially active at said corpus position;
   d) incrementing a counter value when the feature is active at said corpus position;
   e) accumulating a value at each of said evaluation points when said conditional expectation does not equal zero;
   f) advancing to a next position in the corpus;
   g) if the corpus is not fully inspected, repeating steps b) through f); and
   h) when the corpus is fully inspected, dividing each accumulated value by the counter value to provide said gainsum derivative vector.

3. The program storage device of claim 1, wherein the approximation function is selected by applying a least squares fit to the points in the gainsum derivative vector.

4. The program storage device of claim 3, wherein the least squares fit is determined by calculating the coefficients of a polynomial reciprocal expression.

5. The program storage device of claim 1, wherein the approximation function is selected by applying a cubic splines fit to the points in the gainsum derivative vector.

6. The program storage device of claim 1, wherein the instructions for performing the step of determining the argument value comprise instructions for performing the step of calculating the value of an argument, $\gamma^*$, for the approximation function that sets the value of the approximation function equal to $1/(\gamma^*+1)$.

7. The program storage device of claim 6, wherein the instructions for performing the step of determining the approximate value of the gain comprise instructions for performing the step of integrating the approximation function over the range from 0 to $\gamma^*$.

8. A method for ranking features in a language model based upon a gain of the features in an MEMD (maximum entropy/minimum divergence) probability model, comprising the steps of:

receiving as input, a corpus comprising a plurality of words, a list of features representing one of grammatical and semantic relationships among words, and a set of evaluation points;

for each feature,
    determining a value of a gainsum derivative function at each of said corresponding evaluation points, resulting in a gainsum derivative vector;
    selecting a continuous approximation function based upon said gainsum derivative vector;
    determining the argument value that maximizes the value of an approximated gain function from said approximation function; and
    determining the approximate gain value by evaluating the approximated gain function at said argument value;

and
    outputting for use in constructing an MEMD model one of (1) the features and corresponding argument values, for those features having an approximate gain value that exceeds a predetermined threshold value and (2) all the features and corresponding approximate gain values and argument values.

9. A method for ranking features in a language model as defined by claim 8, wherein said step of determining a value of a gainsum derivative function further includes the steps of:

a) inspecting a corpus at a first position;
   b) determining if the feature is at least one of active and potentially active at said corpus position;
   c) calculating a conditional expectation of the base model when the feature is at least one of active and potentially active at said corpus position;
   d) incrementing a counter value when the feature is active at said corpus position;
   e) accumulating a value at each of said evaluation points when said conditional expectation does not equal zero;
   f) advancing to a next position in the corpus;
   g) if the corpus is not fully inspected, repeating steps b) through f); and
   h) when the corpus is fully inspected, dividing each accumulated value by the counter value to provide said gainsum derivative vector.

10. A method for ranking features in a language model as defined by claim 8, wherein the approximation function is selected by applying a least squares fit to the points in the gainsum derivative vector.

11. A method for ranking features in a language model as defined by claim 10, wherein said least squares fit is determined by calculating the coefficients of a polynomial reciprocal expression.

12. A method for ranking features in a language model as defined by claim 8, wherein the approximation function is selected by applying a cubic splines fit to the points in the gainsum derivative vector.

13. A method for ranking features in a language model as defined by claim 8, wherein the step of determining the argument value includes the step of calculating the value of an argument,$\gamma^*$, for said approximation function that sets the value for the approximation function equal to $1/(\gamma^*+1)$.

14. A method for ranking features in a language model as defined by claim 8, wherein the step of determining the approximate value of the gain includes the step of integrating the approximation function over the range from 0 to $\gamma^*$.

15. A program storage device readable by a machine, tangibly embodying a program of instructions executable by the machine for performing method steps for determining a gain value of a feature in an MEMD (maximum entropy/minimum divergence) probability model, the method comprising the steps of:

receiving as input, a corpus comprising a plurality of words, a list of features representing one of grammatical and semantic relationships among words, and a set of evaluation points;

for each feature,
a) expanding a gainsum derivative function having a plurality of summands using a Taylor series expansion, resulting in a plurality of series having coefficients with like powers;
b) truncating said plurality of series at a finite point;
c) inspecting said corpus at a first position;
d) determining if the feature is at least one of active and potentially active at said corpus position;
e) calculating said coefficients when the feature is at least one of active and potentially active at said corpus position;
f) accumulating a set of values corresponding to said coefficients having said like powers;
g) advancing to a next position in the corpus;
h) if the corpus is not fully inspected, repeating steps d) through g); and
i) when the corpus is fully inspected;
   selecting an approximation function based upon said accumulated values;
   determining the argument value that maximizes the value of an approximated gain function from said approximation function; and
   determining the approximate gain value by
evaluating the approximated gain function at said argument value; and
outputting for use in constructing an MEMD model one of (1) the features and corresponding argument values, for those features having an approximate gain value that exceeds a predetermined threshold value and (2) all the features and corresponding approximate rain values and argument values.

16. A system for determining a gain of a feature in an MEMD (maximum entropy/minimum divergence) model comprising:

means for inputting a corpus comprising a plurality of words, a list of features representing one of grammatical and semantic relationships among words, and a set of evaluation points;

means for determining a value of a gainsum derivative function at each of said evaluation points, resulting in a gainsum derivative vector;

means for selecting a continuous approximation function based upon said gainsum derivative vector;

means for determining the argument value that maximizes an approximated gain function from said approximation function;

means for determining the approximate gain value by evaluating said approximated gain function at said argument value and;

means for outputting for use in constructing an MEMD model one of (1) the features and corresponding argument values, for those features having an approximate gain value that exceeds a predetermined threshold value and (2) all the features and corresponding approximate gain values and argument values.

17. A system for evaluating the gain of a feature in a MEMD (maximum entropy/minimum divergence) model comprising:

an input device for inputting a language vocabulary, a corpus comprising a plurality of words, a list of features representing one of grammatical and semantic relationships among words, and a set of evaluation points;

a computer processor;

a first data file including the language vocabulary;

a second data file including the corpus;

a third data file including the plurality of selected evaluation points; and a fourth data file including the plurality of features;

said processor operating under the control of a computer program for accessing the first, second, third and fourth data files and determining an argument value corresponding to each of said features that maximizes a gain function of each of said features and evaluating said gain function of each of said features at said corresponding argument value, yielding the gain of each of said features.

* * * * *